US009184618B2

(12) United States Patent
Endo et al.

(10) Patent No.: US 9,184,618 B2
(45) Date of Patent: Nov. 10, 2015

(54) ELECTRIC VEHICLE BATTERY STORAGE SYSTEM

(71) Applicant: Kabushiki Kaisha Toshiba, Minato-ku (JP)

(72) Inventors: Tamotsu Endo, Tokyo (JP); Jun Fujiwara, Kokubunji (JP)

(73) Assignee: KABUSHIKI KAISHA TOSHIBA (JP)

( * ) Notice: Subject to any disclaimer, the term of this patent is extended or adjusted under 35 U.S.C. 154(b) by 0 days.

(21) Appl. No.: 14/624,710

(22) Filed: Feb. 18, 2015

(65) Prior Publication Data

US 2015/0162757 A1 Jun. 11, 2015

Related U.S. Application Data

(62) Division of application No. 13/558,925, filed on Jul. 26, 2012.

(30) Foreign Application Priority Data

Jul. 29, 2011 (JP) ................................ 2011-166778

(51) Int. Cl.
*H02J 7/00* (2006.01)
*B60L 11/18* (2006.01)
(Continued)

(52) U.S. Cl.
CPC ............. *H02J 7/007* (2013.01); *B60L 11/1822* (2013.01); *B60L 11/1864* (2013.01);
(Continued)

(58) Field of Classification Search
CPC ............. B60L 11/1864; B60L 11/1822; H02J 7/0013; H02J 13/0086; H02J 7/0027; H02J 3/32; H02J 2007/0098; H02J 7/007; Y02E 60/721; Y04S 10/126; Y04S 30/12; Y04S 30/14; Y02T 90/169; Y02T 10/7055; Y02T 90/168; Y02T 90/14; Y02T 90/16; Y02T 10/7061; Y02T 90/124
See application file for complete search history.

(56) References Cited

U.S. PATENT DOCUMENTS 5,760,570 A 6/1998 Nagai et al.
7,484,008 B1 1/2009 Gelvin et al.

(Continued)

FOREIGN PATENT DOCUMENTS

CN 2510716 Y 9/2002
CN 1411205 A 4/2003

(Continued)

OTHER PUBLICATIONS

Extended European Search Report for Application No. EP 12177412.9 dated Dec. 2, 2014 (9 pages).

(Continued)

*Primary Examiner* — Nha Nguyen
(74) *Attorney, Agent, or Firm* — Harness, Dickey & Pierce, P.L.C.

(57) ABSTRACT

According to one embodiment, a storage system includes storage devices configured to execute communication by using an identifier, a converter configured to convert the identifier of the storage devices, a controller configured to execute communication with the storage devices via the converter by using the identifier converted by the converter, convert a DC power output from the storage devices into a DC power of a predetermined magnitude and output the DC power, and charge the storage devices with the DC power of the predetermined magnitude, an AC/DC converter configured to convert the DC power output from the controller into an AC power, convert an AC power supplied from a distribution system into a DC power and supply the DC power to the controller, and a controller configured to control the controller and the AC/DC converter.

3 Claims, 7 Drawing Sheets

(51) Int. Cl.
*H02J 13/00* (2006.01)
*H02J 3/32* (2006.01)

(52) U.S. Cl.
CPC .......... *H02J 7/0013* (2013.01); *H02J 13/0086* (2013.01); *H02J 3/32* (2013.01); *H02J 7/0027* (2013.01); *H02J 2007/0098* (2013.01); *Y02E 60/721* (2013.01); *Y02T 10/7005* (2013.01); *Y02T 10/7055* (2013.01); *Y02T 10/7061* (2013.01); *Y02T 10/7072* (2013.01); *Y02T 90/124* (2013.01); *Y02T 90/14* (2013.01); *Y02T 90/16* (2013.01); *Y02T 90/168* (2013.01); *Y02T 90/169* (2013.01); *Y04S 10/126* (2013.01); *Y04S 30/12* (2013.01); *Y04S 30/14* (2013.01)

(56) References Cited

U.S. PATENT DOCUMENTS

| | | | | |
|---|---|---|---|---|
| 7,514,164 | B2 | 4/2009 | Walter | |
| 2004/0047098 | A1 | 3/2004 | Friedrichs et al. | |
| 2004/0057450 | A1 | 3/2004 | Okuyama | |
| 2007/0080662 | A1 | 4/2007 | Wu | |
| 2008/0143421 | A1 | 6/2008 | Yanagihara et al. | |
| 2009/0310270 | A1 | 12/2009 | Burns et al. | |
| 2010/0224885 | A1 | 9/2010 | Onose | |
| 2011/0127954 | A1 * | 6/2011 | Walley et al. | 320/108 |
| 2011/0153149 | A1 | 6/2011 | Jeon et al. | |
| 2011/0291616 | A1 * | 12/2011 | Kim et al. | 320/109 |
| 2012/0038322 | A1 * | 2/2012 | Moorhead et al. | 320/136 |
| 2012/0326531 | A1 | 12/2012 | Kawamoto et al. | |

FOREIGN PATENT DOCUMENTS

| | | | |
|---|---|---|---|
| CN | 101056004 | A | 10/2007 |
| CN | 101262141 | A | 9/2008 |
| CN | 101335367 | A | 12/2008 |
| CN | 102040010 | A | 5/2011 |
| FR | 2865069 | A1 | 7/2005 |
| JP | 08-065895 | | 3/1996 |
| JP | 2002-163038 | A | 6/2002 |
| JP | 2002-325364 | A | 11/2002 |
| JP | 2003-110568 | A | 4/2003 |
| JP | 2008-220074 | A | 9/2008 |
| JP | 2009-213345 | A | 9/2009 |
| JP | 2012-085494 | A | 4/2012 |

OTHER PUBLICATIONS

Chinese Office Action for Application No. 2012-10146864.5 dated Mar. 5, 2014 with English translation (20 pages).

Chinese Office Action for Application No. 2012-10168989.8 dated Mar. 21, 2014 with English translation (18 pages).

Extended European Search Report for Application No. EP 12 17 3096 dated Nov. 6, 2014 (7 pages).

Japanese Office Action for Application No. 2011-138946 dated Jan. 13, 2015 with English translation (6 pages).

* cited by examiner

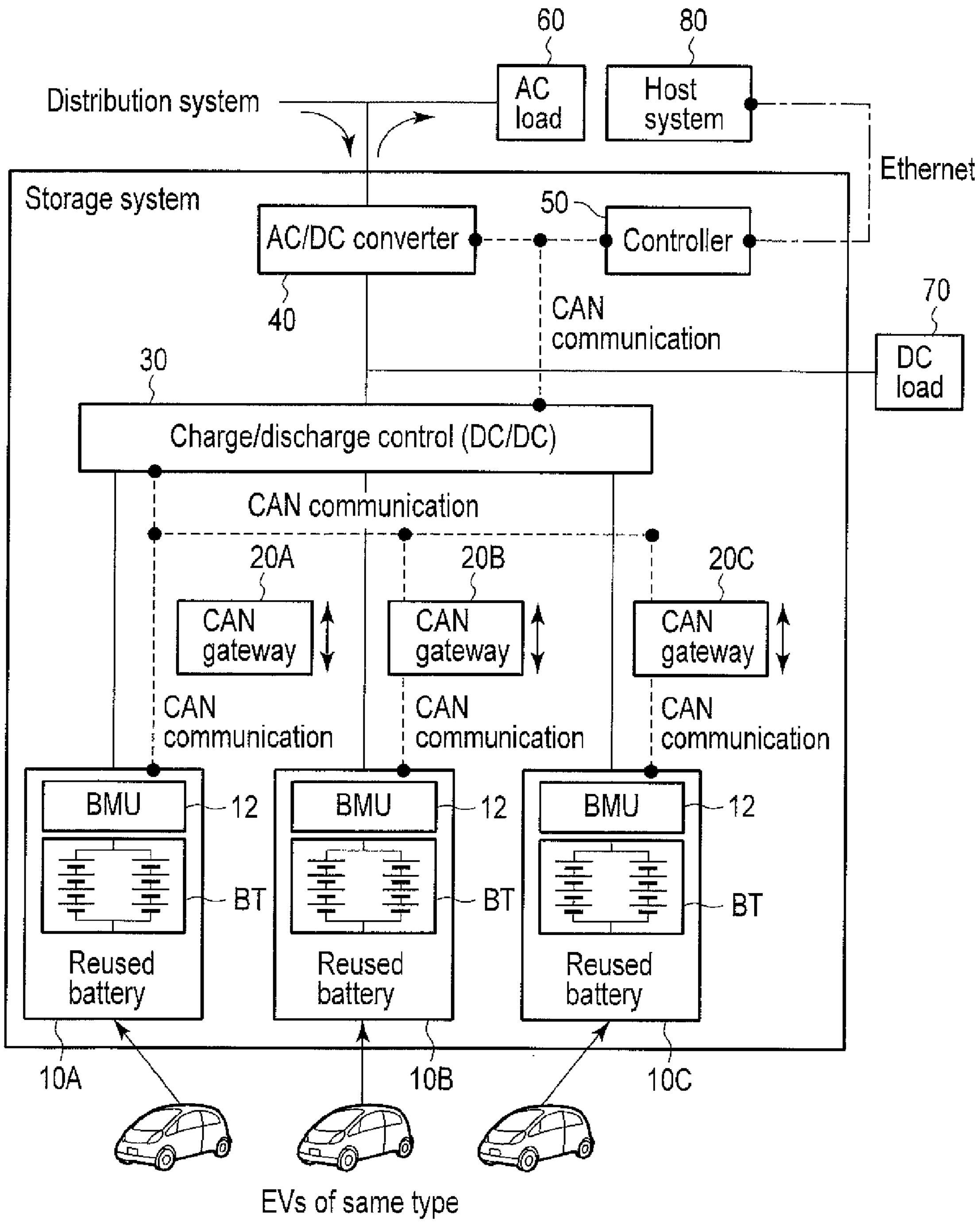
F I G. 2

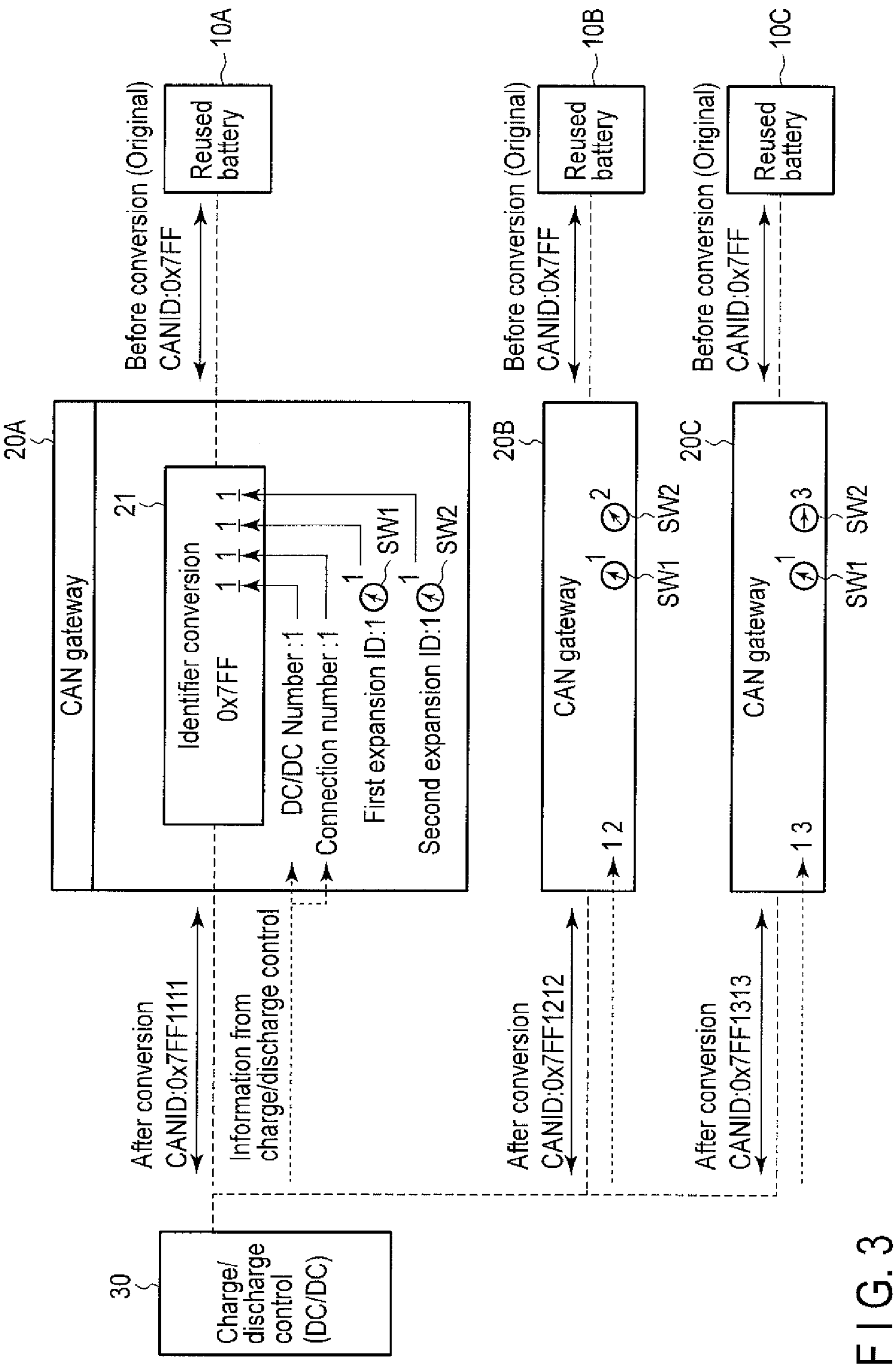
F I G. 3

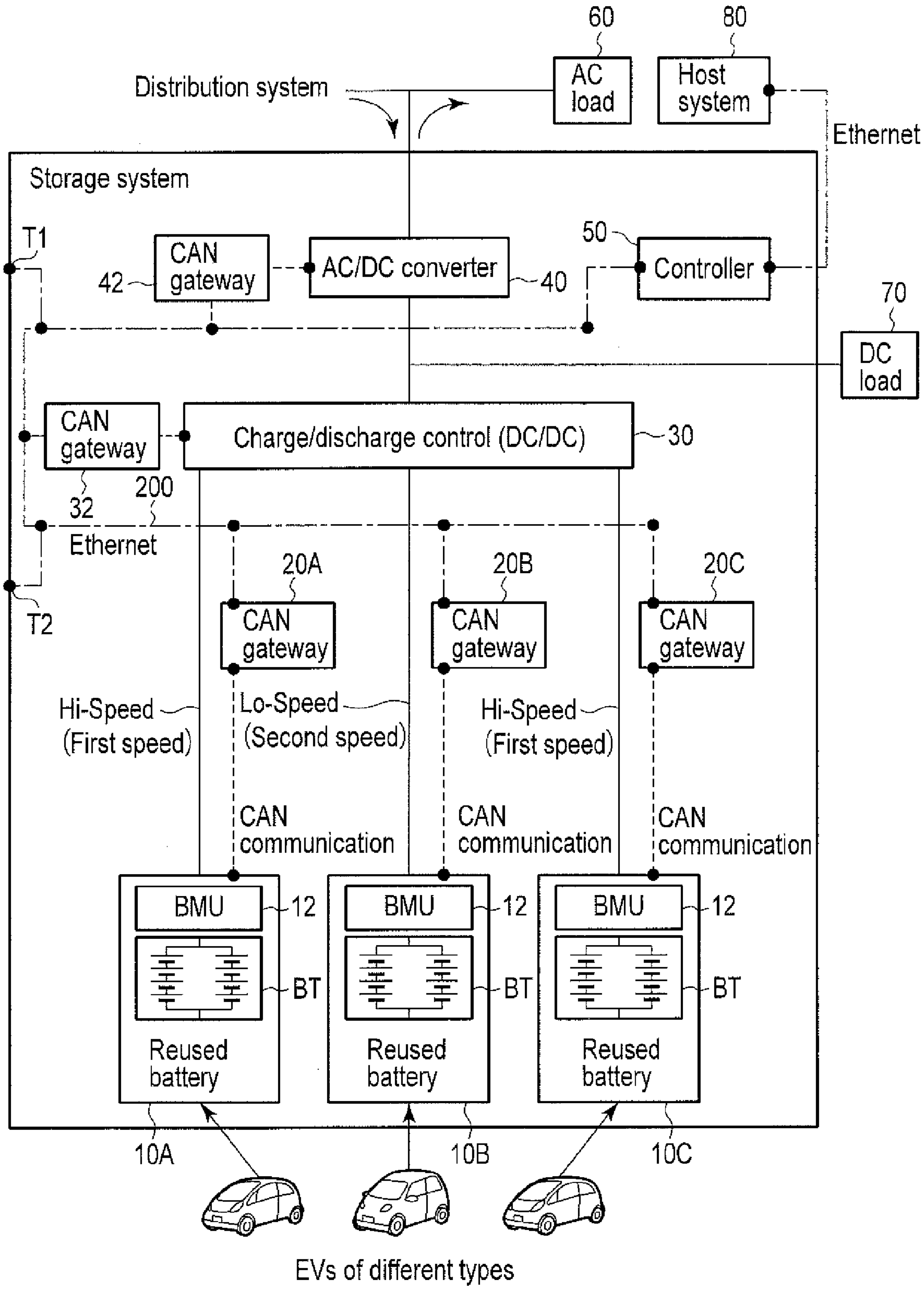
F I G. 6

ELECTRIC VEHICLE BATTERY STORAGE SYSTEM

CROSS-REFERENCE TO RELATED APPLICATIONS

This application is a divisional patent application of U.S. application Ser. No. 13/558,925 filed Jul. 26, 2012, which claims priority to Japanese Patent Application No. 2011-166778, filed Jul. 29, 2011, all of which are incorporated herein by reference in their entireties.

FIELD

Embodiments described herein relate generally to a storage system.

BACKGROUND

Recently, vehicles such as an electronic vehicle (EV) having a motor driven by an electric power supplied from a battery have spread. The electric vehicle comprises a storage device which comprises both the battery and a battery management unit (BMU) configured to control charging and discharging of the battery. The battery management unit exchanges control information with an electronic control unit (ECU) of the electric vehicle by a control area network (CAN) communication protocol. The CAN communication protocol identifies communication information by a unique identifier called CANID, in the communication area. The BMU therefore executes communication using a unique identifier in the communication area of the electric vehicle.

BRIEF DESCRIPTION OF THE DRAWINGS

FIG. 2 schematically shows a configuration example of a storage system of a second embodiment;

FIG. 3 shows a configuration example of a CAN gateway in the storage system shown in FIG. 2;

FIG. 6 schematically shows a configuration example of a storage system of a fourth embodiment.

DETAILED DESCRIPTION

In general, according to one embodiment, a storage system includes a plurality of storage devices configured to execute communication by using an identifier; a converter configured to convert the identifier of the plurality of storage devices; a charge/discharge controller configured to execute communication with the plurality of storage devices via the converter by using the identifier converted by the converter, convert a DC power output from the plurality of storage devices into a DC power of a predetermined magnitude and output the DC power, and charge the storage devices with the DC power of the predetermined magnitude; an AC/DC converter configured to convert the DC power output from the charge/discharge controller into an AC power, convert an AC power supplied from a distribution system into a DC power and supply the DC power to the charge/discharge controller; and a controller configured to control the charge/discharge controller and the AC/DC converter.

A storage system of embodiments will be described below with reference to the accompanying drawings.

Figure 1:
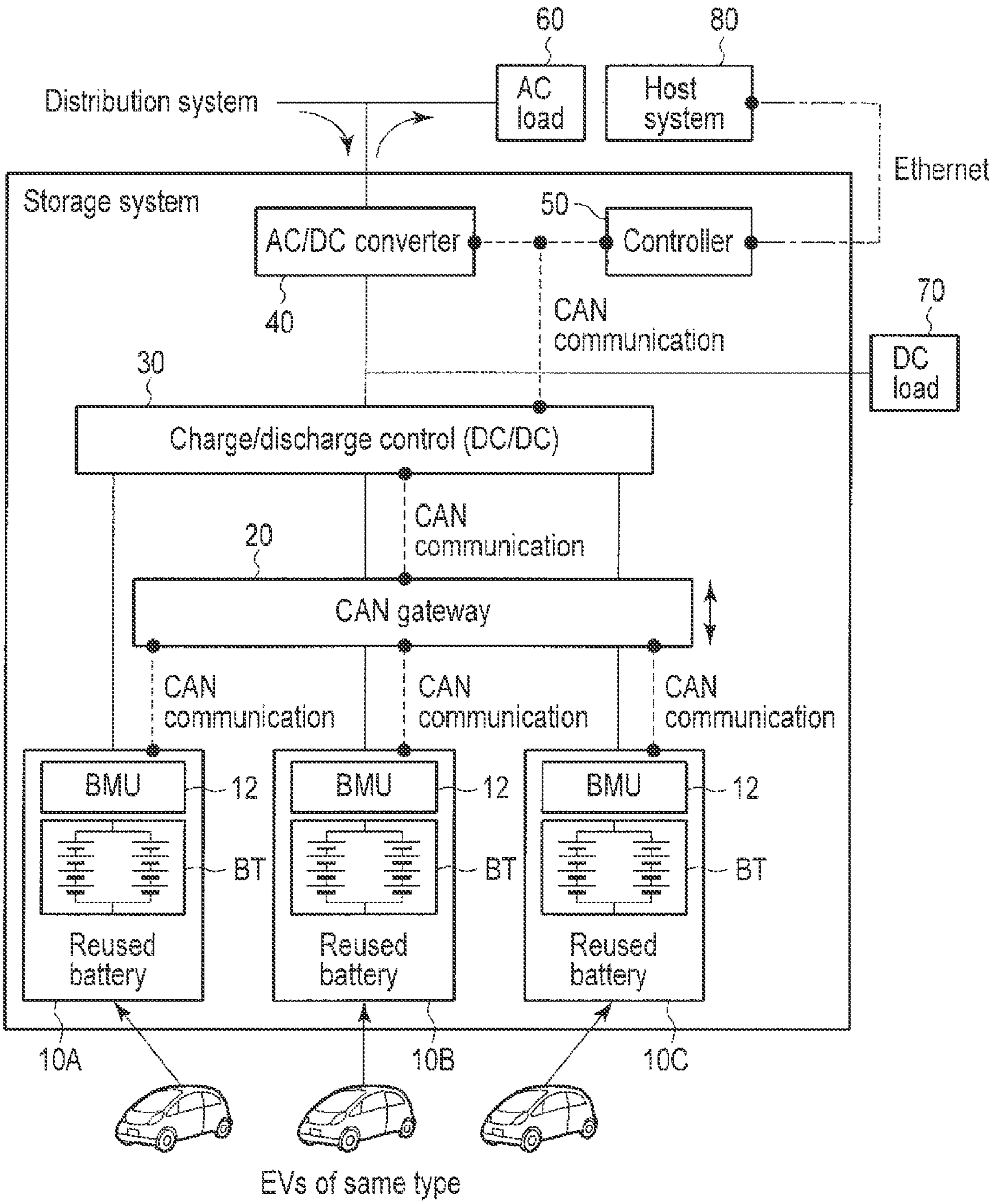
FIG. 1 schematically shows a configuration example of a storage system of a first embodiment.

FIG. 1 schematically shows a configuration example of a storage system of a first embodiment. The storage system of the present embodiment comprises a plurality of storage devices 10A, 10B and 10C, a CAN gateway 20 serving as a converter, a charge/discharge controller 30, an AC/DC converter 40, and a controller 50.

First, a power system of the storage system of the present embodiment will be described.

Each of the plurality of storage devices 10A, 10B and 10C comprises an assembled battery BT containing a plurality of battery cells, and a battery management unit 12. The storage devices 10A, 10B and 10C are reused batteries which have been used on electric vehicles of the same type.

In the present embodiment, the battery cells of the assembled battery BT are lithium-ion batteries. The battery cells are not limited to lithium-ion batteries, but may be other batteries such as nickel-hydrogen batteries, lead batteries and nickel-cadmium batteries.

The battery management unit 12 monitors temperature and voltage of the battery cells, equalizes charge amounts of the battery cells, and controls charging and discharging of the assembled battery BT. The battery management unit 12 executes communications by using a CAN communication protocol.

The charge/discharge controller 30 is a DC/DC converter which comprises a PWM (pulse width modulation) controllable switching device, and which receives a DC power from each of the plurality of storage devices 10A, 10B and 10C, converts the DC power into a DC power of a predetermined magnitude, and outputs the DC power to a DC load 70 or receives a DC power output from the AC/DC converter 40, converts the DC power into a DC power of a predetermined magnitude, and outputs the DC power to the storage devices 10A, 10B and 10C.

For example, a DC power of 200-300V is mutually transmitted between the storage devices 10A, 10B and 10C, and the charge/discharge controller 30, and a DC power of 350V-400V is mutually transmitted between the charge/discharge controller 30 and AC/DC converter 40.

The AC/DC converter 40 is a bidirectional converter, which is connected to a distribution system, an AC load 60, the charge/discharge controller 30, and the DC load 70. The AC/DC converter 40 comprises a PWM controllable switching device, and converts the AC power supplied from the distribution system into the DC power and outputs the DC power to the charge/discharge controller 30 or DC load 70, or converts the DC power output from the charge/discharge controller 30 into the AC power and outputs the AC power to the distribution system and AC load 60. For example, the AC power of 200V-220V is mutually transmitted between the distribution system and the AC/DC converter 40.

Next, a communication system in the storage system of the present embodiment will be described.

The storage system of the present embodiment communicates with the outside by Ethernet®, and communication is executed inside the storage system by the CAN communication protocol.

The controller 50 transmits a control signal to the charge/discharge controller 30 and the AC/DC converter 40, in accordance with a control signal from a host system 80. The controller 50 communicates with the host system 80 by Ethernet®, and communicates with the charge/discharge controller 30 and the AC/DC converter 40 by the CAN communication protocol.

The CAN gateway 20 converts CANID (identifier) used when the storage devices 10A, 10B and 10C communicate by the CAN communication protocol into a CANID which can be identified by the charge/discharge controller 30.

The CAN gateway 20 may use, for example, an identifier notified by the charge/discharge controller 30 or controller 50 as the CANID of the storage devices 10A, 10B and 10C, or may use an identifier according to a position of a hardware configuration to which the storage devices 10A, 10B and 10C are attached as the CANID of the storage devices 10A, 10B and 10C. The CAN gateway 20 may create an identifier by using a number assigned to the charge/discharge controller 30 to which the storage devices 10A, 10B and 10C are connected and numbers assigned sequentially to the plurality of storage devices connected to the charge/discharge controller 30.

Thus, even if the CANIDs used in the plurality of storage devices 10A, 10B and 10C are duplicated, the charge/discharge controller 30 can communicate with the plurality of storage devices 10A, 10B and 10C via the CAN gateway 20.

The charge/discharge controller 30 communicates with the plurality of storage devices 10A, 10B and 10C via the CAN gateway 20. For example, if the overcharge or overdischarge of the battery cell is notified, the charge/discharge controller 30 notifies the controller of the abnormality and protects the storage devices by suspension of charging, suspension of discharging, etc.

Since the charge/discharge controller 30 and the plurality of storage devices 10A, 10B and 10C communicate with each other via the CAN gateway 20 as described above, the charge/discharge controller corresponding to each of the plurality of storage devices 10A, 10B and 10C does not need to be provided. Even if the reused battery is incorporated in the storage system, increase in costs for the storage system can be prevented.

The storage device carried on a vehicle such as the electric vehicle is exchanged with a new storage device when a storage capacity of the battery is smaller than a predetermined amount. The storage device used on the electric vehicle cannot be used as a power supply of the electric vehicle, but can be used for the other purposes.

It is expected that a number of used storage devices reducing the value of use as the power supplies of the electric vehicles will appear in future as spreading of the electric vehicles. Thus, reuse of the used storage devices has been desired.

When the used storage devices are to be reused, it is desirable to use the batteries and battery management units as they are. However, if the storage system was constituted by combining the battery management units which have executed communication under the CAN communication protocol on a plurality of electric vehicles of the same type, CANIDs for exchanging the control information were duplicated and the control was unable to be executed by a common battery charge/discharge controller. If a charge/discharge controller was provided for one storage device, reduction of the costs for the storage system was difficult.

In addition, the communication rates of the battery management units were often varied, based on difference in the type of the storage devices. In this case, the control signal was unable to be communicated by the CAN communication protocol.

In other words, according to the storage system of the present embodiment, a cheap storage system allowing the used storage devices to be mounted can be provided.

Next, a storage system of the second embodiment will be described below with reference to the drawings. In the following descriptions, the same constituent elements as those in the first embodiment are denoted with the same reference numbers and their explanations are omitted.

FIG. 2 schematically shows a configuration example of the storage system of the present embodiment. The storage system of the present embodiment is different in configuration of communication system from the above-described first embodiment. The storage system of the present embodiment comprises the same number of CAN gateways 20A, 20B and 20C as a plurality of storage devices 10A, 10B and 10C. The storage system of the present embodiment comprises the same configuration as the storage system of the first embodiment except the configuration of the CAN gateways 20A, 20B and 20C.

FIG. 3 shows a configuration example of the CAN gateways 20A, 20B and 20C in the storage system of the present embodiment. Each of the CAN gateways 20A, 20B and 20C comprises an identifier converter 21 and rotary switches 20A and 20B. In FIG. 3, all of CANIDs which the plurality of storage devices 10A, 10B and 10C-use for communication are "0x7FF" and are duplicated.

An identifier converter 21 converts a CANID used in each of the storage devices 10A, 10B and 10C with a DC/DC number and a connection number provided by a charge/discharge controller 30, and a first expansion ID and a second expansion ID set in each of the storage devices 10A, 10B and 10C.

The DC/DC number provided by the charge/discharge controller 30 is the number assigned to the charge/discharge controller 30 to which the storage devices 10A, 10B and 10C are connected. Since the storage system of the present embodiment comprises the single charge/discharge controller 30, a common DC/DC number "1" is provided to the storage devices 10A, 10B and 10C.

The connection number provided by the charge/discharge controller 30 is the number assigned sequentially to each of the storage devices 10A, 10B and 10C connected to the single charge/discharge controller 30. In the present embodiment, a connection number of the storage device 10A is "1", a connection number of the storage device 10B is "2", and a connection number of the storage device 10C is "3".

Each of the CAN gateways 20A, 20B and 20C comprises two rotary switches SW1 and SW2 to which numbers corresponding to positions of knobs are assigned. The first expansion ID and the second expansion ID are set by operating the rotary switches SW1 and SW2. In the present embodiment, the first expansion ID of the storage device 10A is "1" and the second expansion ID thereof is "1", the first expansion ID of the storage device 10B is "1" and the second expansion ID thereof is "2", and the first expansion ID of the storage device 10C is "1" and the second expansion ID thereof is "3".

The identifier converter 21 converts the CANID of each of the storage devices 10A, 10B and 10C, with the DC/DC number, the connection number, the first expansion ID, and the second expansion ID. In other words, numbers of four digits are added in order of the DC/DC number, the connection number, the first expansion ID and the second expansion ID, to the end of original CANID "0x7FF" of each of the storage devices 10A, 10B and 10C, to form a new CANID. More specifically, an expansion ID of expansion format 18 bit in the CAN data frame, etc. are utilized.

The CAN gateway 20A adds "1111" to the end of the original CANID "0x7FF" of the storage device 10A to form a CANID "0x7FF1111" upon executing communication from the storage device 10A to the charge/discharge controller 30, and removes the numbers of four digits at the end of the CANID "0x7FF1111" to form the CANID "0x7FF" upon executing communication from charge/discharge controller 30 to the storage device 10A.

The CAN gateway 20B adds "1212" to the end of the original CANID "0x7FF" of the storage device 10B to form a CANID "0x7FF1212" upon executing communication from the storage device 10B to the charge/discharge controller 30, and removes the numbers of four digits at the end of the CANID "0x7FF1212" to form the CANID "0x7FF" upon executing communication from charge/discharge controller 30 to the storage device 10A.

The CAN gateway 20C adds "1313" to the end of the original CANID "0x7FF" of the storage device 10C to form a CANID "0x7FF1313" upon executing communication from the storage device 10C to the charge/discharge controller 30, and removes the numbers of four digits at the end of the CANID "0x7FF1313" to form the CANID "0x7FF" upon executing communication from charge/discharge controller 30 to the storage device 10C.

In the present embodiment, the identifier converter 21 converts the CANID by combining the numbers provided by the charge/discharge controller 30 with the numbers set in each of the CAN gateways 20A, 20B and 20C, but may convert the CANID by the numbers provided by the charge/discharge controller 30 alone or by the numbers set in each of the CAN gateways 20A, 20B and 20C alone.

Since the charge/discharge controller 30 and the plurality of storage devices 10A, 10B and 10C communicate with each other via the CAN gateways 20A, 20B and 20C as described above, the charge/discharge controller corresponding to each of the plurality of storage devices 10A, 10B and 10C does not need to be provided, similarly to the above-described first embodiment. Even if the reused battery is incorporated in the storage system, increase in costs for the storage system can be prevented.

Furthermore, by connecting the CAN gateways 20A, 20B and 20C to the plurality of storage devices 10A, 10B and 10C, respectively, the CAN gateways can be increased or decreased in accordance with the increase or decrease of the storage devices incorporated in the storage system, and the size of the storage system can be easily changed.

In other words, according to the storage system of the present embodiment, a cheap storage system allowing the used storage devices to be mounted can be provided.

Next, a storage system of the third embodiment will be described below with reference to the drawings.

Figure 4:
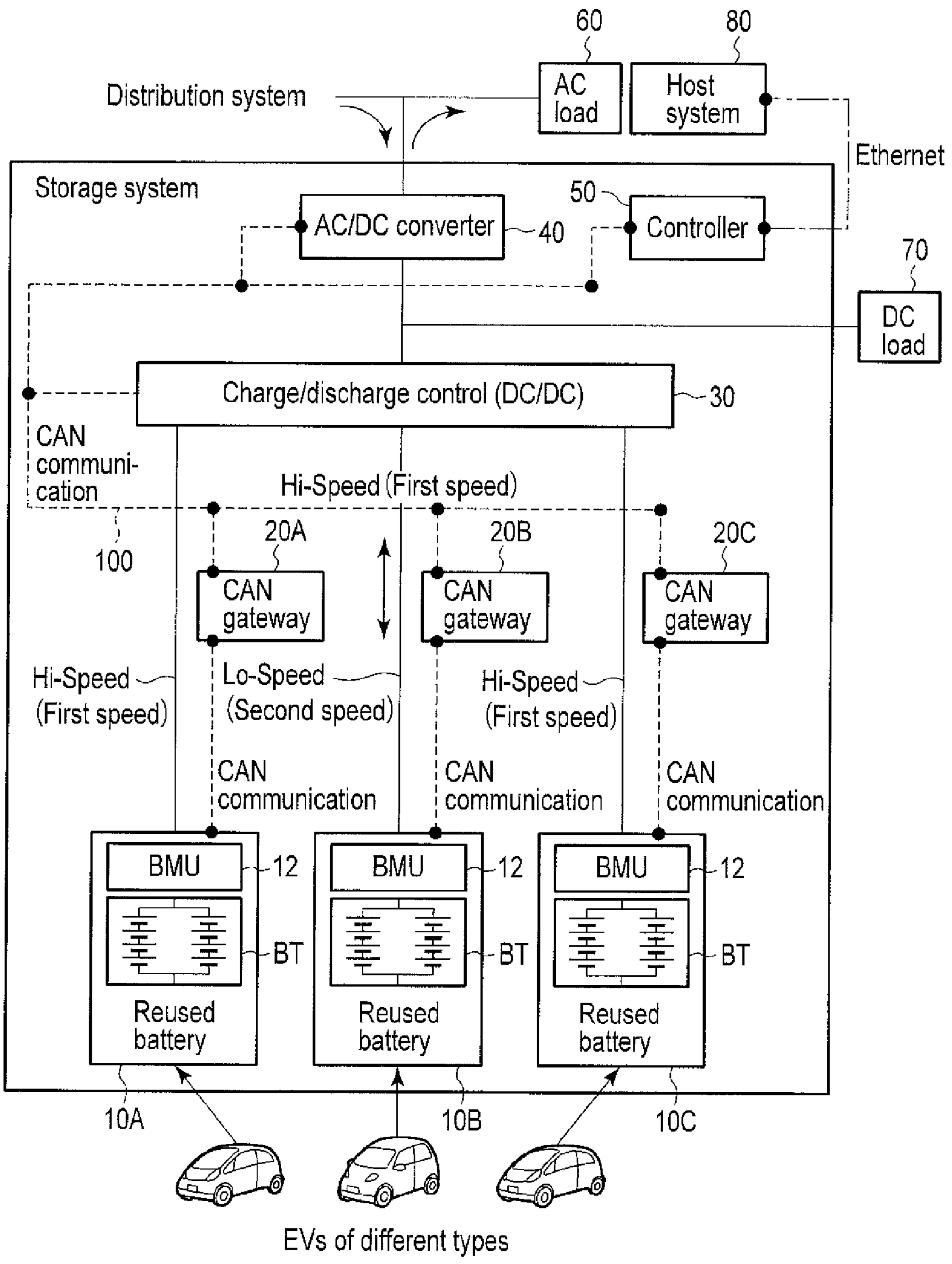
FIG. 4 schematically shows a configuration example of a storage system of a third embodiment.

FIG. 4 schematically shows a configuration example of the storage system of the present embodiment. The storage system of the present embodiment is different in configuration of communication system from the above-described first embodiment. In the storage system of the present embodiment, a plurality of storage devices 10A, 10B and 10C are the reused batteries which have been used on the electric vehicles of different types. Battery management units 12 of the storage devices 10A and 10C communicate at the same speed as a communication speed (first speed) [bps] of the CAN communication in the storage system while the battery management unit 12 of the storage device 10B communicates at a communication speed (second speed) [bps] slower than the communication speed in the storage system.

The storage system of the present embodiment comprises CAN gateways 20A, 20B and 20C as the same number of converters as the plurality of storage devices 10A, 10B and 10C. The plurality of CAN gateways 20A, 20B and 20C are connected to a CAN communication bus line 100. A charge/discharge controller 30, an AC/DC converter 40, and a controller 50 are also connected to a CAN communication bus line 100.

By connecting the CAN gateways 20A, 20B and 20C, the charge/discharge controller 30, and the controller 50 to the single CAN communication bus line 100 as described above, information reference of the storage devices 10A, 10B and 10C can be freely executed at the charge/discharge controller 30 and the controller 50.

The plurality of CAN gateways 20A, 70B and 20C convert the CANIDs used by the storage devices 10A, 10B and 10C and, if there are storage devices having different CAN communication speeds, allow the communication speeds to cooperate with each other.

Figure 5:
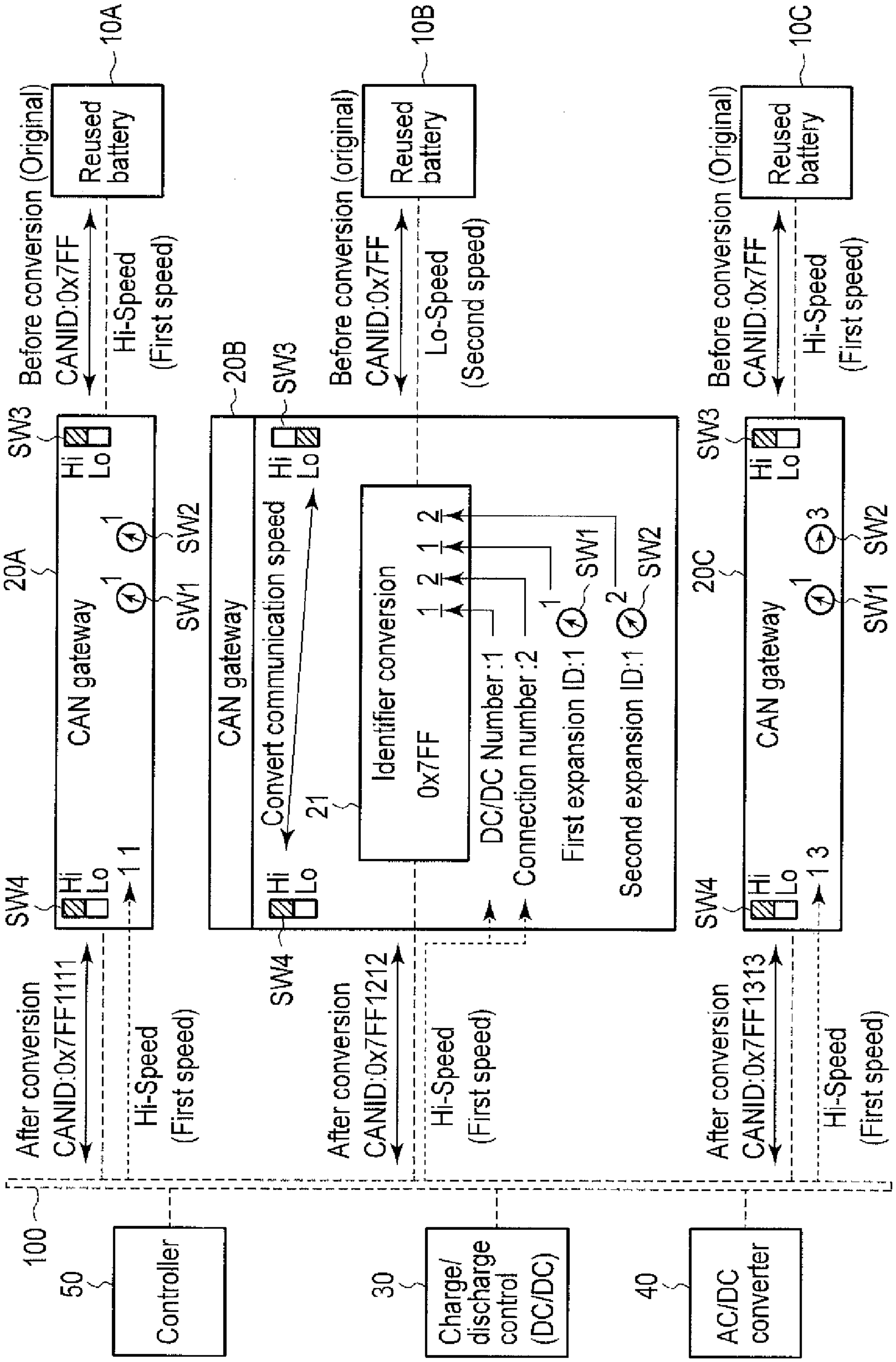
FIG. 5 shows a configuration example of a CAN gateway in the storage system shown in FIG. 4.

FIG. 5 shows a configuration example of the CAN gateways 20A, 20B and 20C in the storage system of the present embodiment. Each of the CAN gateways 20A, 20B and 20C comprises an identifier converter 21, rotary switches SW1 and SW2, and communication speed setting switches SW3 and SW4.

The operations of the identifier converter 21 are the same as those in the storage system of the above-described second embodiment. In other words, the identifier converter 21 converts the CANID used in each of the storage devices 10A, 10B and 10C with the DC/DC number and the connection number provided by the charge/discharge controller 30, and the first expansion ID and the second expansion ID set in each of the CAN gateways 20A, 20B and 20C.

The CAN gateway 20A adds "1111" to the end of the original CANID "0x7FF" of the storage device 10A to form a CANID "0x7FF1111" upon executing communication from the storage device 10A to the charge/discharge controller 30, and removes the four-digit number from the end of the CANID "0x7FF1111" to form the CANID "0x7FF" upon executing communication from charge/discharge controller 30 to the storage device 10A.

The CAN gateway 20B adds "1212" to the end of the original CANID "0x7FF" of the storage device 10B to form a CANID "0x7FF1212" upon executing communication from the storage device 10B to the charge/discharge controller 30, and removes the four-digit number from the end of the CANID "0x7FF1212" to form the CANID "0x7FF" upon executing communication from charge/discharge controller 30 to the storage device 10A.

The CAN gateway 20C adds "1313" to the end of the original CANID "0x7FF" of the storage device 10C to form a CANID "0x7FF1313" upon executing communication from the storage device 10C to the charge/discharge controller 30, and removes the four-digit number from the end of the CANID "0x7FF1313" to form the CANID "0x7FF" upon executing communication from charge/discharge controller 30 to the storage device 10C.

In addition, each of the CAN gateways 20A, 20B and 20C comprises the communication speed setting switch SW3 for setting the speed of communication with the storage devices 10A, 10B and 10C and the communication speed setting switch SW4 for setting the speed of communication with the charge/discharge controller 30 and the controller 50. The communication speed setting switches SW3 and SW4 are dip switches for changing the knobs to, for example, a Lo (second speed) side and a Hi (first speed) side.

In the present embodiment, since the communication speed (second speed) of the storage device 10B is different from the communication speed (first speed) in the storage system, the communication speed setting switch SW3 is changed to the Lo side and the communication speed setting switch SW4 is changed to the Hi side. In this case, the CAN gateway 20B communicates with the storage device 10B at the second speed and communicates with the charge/discharge controller 30 and the controller 50 at the first speed. For this reason, the communication speeds of the storage devices incorporated in the storage system are not limited and various types of reused batteries can be mounted.

Since the charge/discharge controller 30 and the plurality of storage devices 10A, 10B and 10C communicate with each other via the CAN gateways 20A, 20B and 20C as described above, the charge/discharge controller corresponding to each of the plurality of storage devices 10A, 10B and 10C does not need to be Provided, similarly to the above-described first embodiment. Even if the reused battery is incorporated in the storage system, increase in costs for the storage system can be prevented.

Furthermore, by connecting the CAN gateways 20A, 20B and 20C to the Plurality of storage devices 10A, 10B and 10C, respectively, the CAN gateways can be increased or decreased in accordance with the increase or decrease of the storage devices incorporated in the storage system, and the size of the storage system can be easily changed, similarly to the above-described second embodiment.

In the present embodiment, since each of the CAN gateways 20A, 20B and 20C comprises the communication speed setting switches SW3 and SW4, the storage device which executes communication at the communication speed different from the communication speed in the storage system can also be mounted. If the communication speed in the storage system is constant and is not varied, the communication speed setting switch SW4 may be omitted.

In other words, according to the storage system of the present embodiment, a cheap storage system allowing the used storage devices to be mounted can be provided.

Next, a storage system of a fourth embodiment will be described below with reference to the drawings.

FIG. 6 schematically shows a configuration example of the storage system of the present embodiment. The storage system of the present embodiment is different in configuration of communication system from the above-described first embodiment. In the storage system of the present embodiment, a plurality of storage devices 10A, 10B and 10C are reused batteries which have been used on electric vehicles of different types. Battery management units 12 of the storage devices 10A and 10C communicate at a first speed (Hi-speed) while a battery management unit 12 of the storage device 10B communicates at a second speed (Lo-speed).

The storage system of the present embodiment comprises the same number of CAN gateways 20A, 20B and 20C as the plurality of storage devices 10A, 10B and 10C, as converters, and further comprises a CAN gateway (second converter) 32 connected to a charge/discharge controller 30 and a CAN gateway (third converter) 42 connected to an AC/DC converter 40.

A plurality of CAN gateways 20A, 20B and 20C are connected to an Ethernet communication line 200. The CAN gateways 32 and 42, and a controller 50 are also connected to the Ethernet communication line 200.

The plurality of CAN gateways 20A, 20B and 20C communicate with the storage devices 10A, 10B and 10C by using CANID and communicate with the CAN gateways 32 and 42, and a controller 50 by using IP addresses.

The CAN gateway 32 communicates with a charge/discharge controller 30 by using the CANID and communicates with the CAN gateways 20A, 20B, 20C and 42, and the controller 50 by using the IP addresses.

The CAN gateway 42 communicates with the AC/DC converter 40 by using the CANID and communicates with the CAN gateways 20A, 20B, 20C and 32, and the controller 50 by using the IP addresses.

By connecting the CAN gateways 20A, 20B and 20C, the CAN gateways 32 and 42, and the controller 50 to the single Ethernet communication line 200 as described above, information reference of the storage devices 10A, 10B and 10C can be freely executed at the charge/discharge controller 30 and the controller 50. In addition, some or all parts of the CAN gateways 20A, 20B, 20C, 32 and 42 can also be integrated. The CAN gateways can also execute CAN communication with the storage devices 10A, 10B and 10C and execute Ethernet communication with the controller 50.

The storage system of the present embodiment also comprises connection units T1 and T2 which can be connected with other external devices. The connection units T1 and T2 are connected with the Ethernet communication line 200. Devices which execute the Ethernet communication, for example, other DC power supply devices, data centers, communication terminals, etc. can be connected to the connection units T1 and T2. The devices connected to the connection units T1 and T2 can communicate with the controller 50 and the CAN gateways 20A, 20B, 20C, 32 and 42 via the Ethernet communication line 200.

If the storage devices are different in communication speed, the plurality of CAN gateways 20A, 20B and 20C allow the communication speeds to cooperate with each other.

Figure 7:
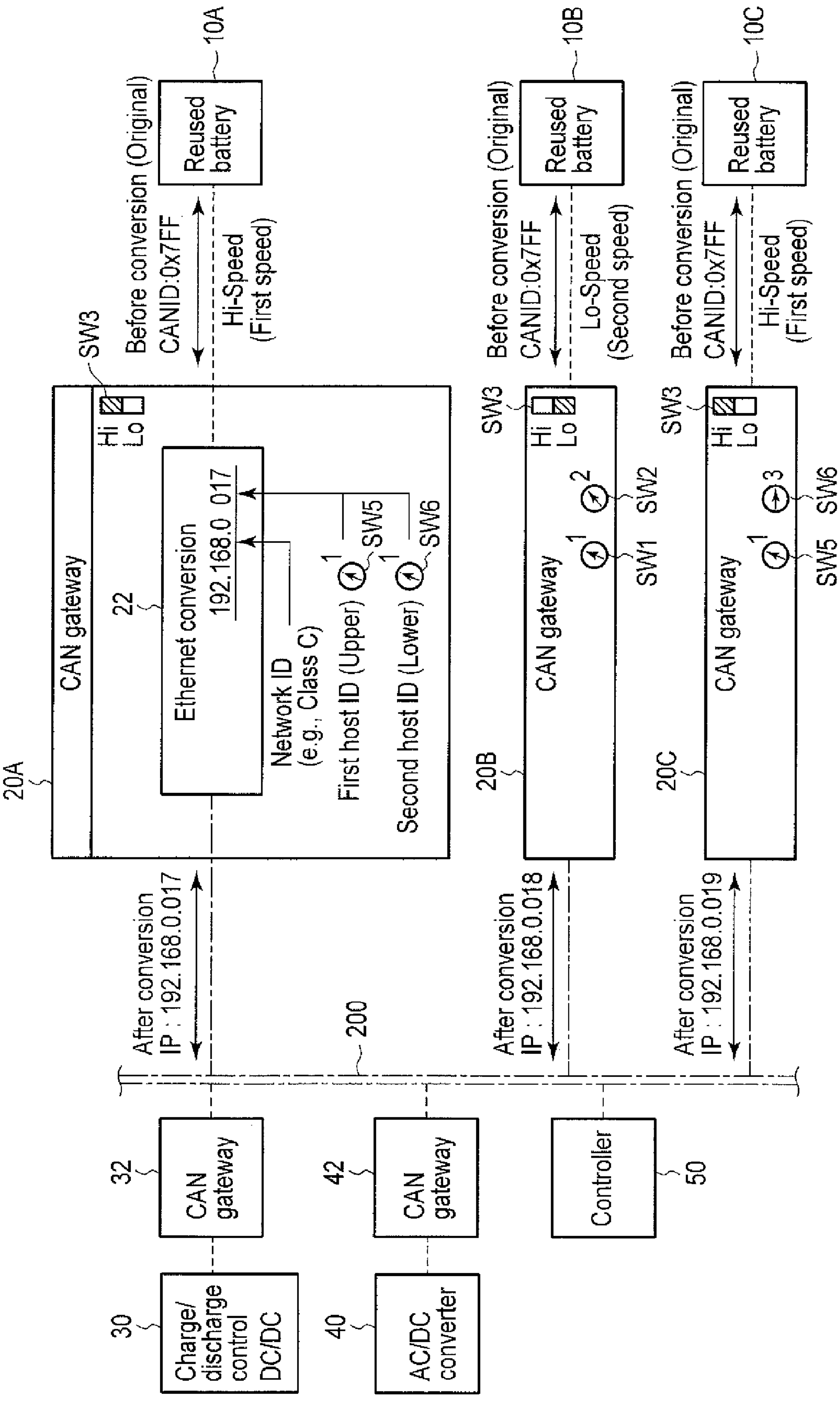
FIG. 7 shows a configuration example of a CAN gateway in the storage system shown in FIG. 6.

FIG. 7 shows a configuration example of the CAN gateways 20A, 20B, 20C, 32 and 42 in the storage system of the present embodiment. Each of the CAN gateways 20A, 20B and 20C comprises an Ethernet converter 22, rotary switches SW5 and SW6, and a communication speed setting switch SW3.

The Ethernet converter 22 creates an IP address to be used for the Ethernet communication by using a network ID, a first host ID, and a second host ID. In the present embodiment, the network ID in the storage system is "192.168.0". The first host ID is set in accordance with a position of a knob of the rotary switch SW5. The second host ID is set in accordance with a position of a knob of the rotary switch SW6.

The Ethernet converter 22 creates the IP address by adding numbers corresponding to the first host ID and the second host ID to the end of the network ID "192.168.0.". In FIG. 7, the Ethernet converter 22 creates the IP address of class C. It is desirable that the class of the IP address is selected in accordance with the size of the network.

For example, the Ethernet converter 22 of the CAN gateway 20A adds a number "017" corresponding to the first host ID "1" and the second host ID "1" to the end of the network ID "192.168.0." to create an IP address "192.168.0.017". The CAN gateway 20A communicates with the storage device 10A by using a CANID "0x7FF" of the storage device 10A and executes communication via the Ethernet communication line 200 by using the created IP address "192.168.0.017".

The Ethernet converter 22 of the CAN gateway 20B adds a number "018" corresponding to the first host ID "1" and the second host ID "2" to the end of the network ID "192.168.0." to create an IP address "192.168.0.018". The CAN gateway 20B communicates with the storage device 10B by using the CANID "0x7FF" of the storage device 10B and executes communication via the Ethernet communication line 200 by using the created IP address "192.168.0.018".

The Ethernet converter 22 of the CAN gateway 20C adds a number "019" corresponding to the first host ID "1" and the second host ID "3" to the end of the network ID "192.168.0."

to create an IP address "192.168.0.019". The CAN gateway 20C communicates with the storage device 10C by using the CANID "0x7FF" of the storage device 10C and executes communication via the Ethernet communication line 200 by using the created IP address "192.168.0.019".

Each of the CAN gateways 32 and 42 also comprises the same configuration as the CAN gateways 20A, 20B and 20C, and creates IP addresses by using the network ID, the first host ID, and the second host ID though not shown in FIG. 7.

The CAN gateways 20A, 20B and 20C comprises the communication speed setting switches SW3 for setting the speeds of communication with the storage devices 10A, 10B and 10C, respectively. Each of the communication speed setting switches SW3 is a dip switch for changing a knob to, for example, a second speed (Lo) side or a first speed (Hi) side.

In the present embodiment, the communication speed of each of the storage devices 10A and 10C is the first speed while the communication speed of the storage device 10B is the second speed. Therefore, the communication speed setting switch SW3 of each of the CAN gateways 20A and 20B is changed to the Hi side, and the communication speed setting switch SW3 of the CAN gateway 20C is changed to the Lo side. Thus, the communication speeds of the storage devices incorporated in the storage system are not limited, and various types of reused batteries can be mounted.

Since the charge/discharge controller 30 and the plurality of storage devices 10A, 10B and 10C communicate with each other via the CAN gateways 20A, 20B and 20C as described above, the devices can be specified by the IP addresses. For this reason, a charge/discharge controller corresponding to each of the plurality of storage devices 10A, 10B and 10C does not need to be provided. Even if the reused battery is incorporated in the storage system, increase in costs for the storage system can be prevented.

Furthermore, since the Ethernet communication is executed by using the IP addresses in the storage system, the identifier can be selected in a wider range as compared with the use of the CAID. In addition, according to the Ethernet communication, since the communication speeds can be enhanced and the communication band is wider as compared with the CAN communication, more information elements can be communicated at a high speed. By executing the Ethernet communication in the storage system, connection of the other devices to the connection units T1 and T2 to expand the devices can be easily implemented and a more generalized system can be provided.

By connecting the CAN gateways 20A, 20B and 20C to the plurality of storage devices 10A, 10B and 10C, respectively, the CAN gateways can be increased or decreased in accordance with the increase or decrease of the storage devices incorporated in the storage system, and the size of the storage system can be easily changed, similarly to the above-described second embodiment.

In the present embodiment, since each of the CAN gateways 20A, 20B and 20C comprises the communication speed setting switch SW3, various types of storage devices can be mounted.

In other words, according to the storage system of the present embodiment, a cheap storage system allowing the used storage devices to be mounted can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without department from the spirit of the inventions. The accompanying claims and their equivalents are intended to cover such forms or modification as would fall within the scope and spirit of the inventions.

The invention claimed is:

1. A storage system comprising:
a plurality of storage devices configured to execute communication at a predetermined communication speed by using identifiers;
a charge/discharge controller configured to convert a DC power output from the plurality of storage devices into a DC power of a predetermined magnitude and output the DC power, and charge the storage devices with the DC power of the predetermined magnitude;
an AC/DC converter configured to convert the DC power output from the charge/discharge controller into an AC power, convert an AC power supplied from a distribution system into a DC power, and supply the DC power to the charge/discharge controller;
a controller configured to control the charge/discharge controller and the AC/DC converter; and
a converter comprising a communication speed setting module configured to convert a communication speed of the storage devices to a communication speed in the storage system for communication with the plurality of storage devices, and intervening between the plurality of storage devices and the charge/discharge controller;
wherein:
the plurality of storage devices include a first storage device configured to execute communication at a first communication speed and a second storage device configured to execute communication at a second communication speed which is different from the first communication speed;
the converter includes an identifier converter configured to convert the identifier used in each of the storage devices with a DC/DC number and a connection number provided by the charge/discharge controller, and a first expansion ID and a second expansion ID set in each of the storage devices; and
the DC/DC number is a number assigned to the charge/discharge controller to which each of the storage devices is connected, and the connection number is a number assigned sequentially to each of the storage devices connected to the single charge/discharge controller.

2. The storage system of claim 1, the identifier converter comprises switches to set the first expansion ID and the second expansion ID.

3. The storage system of claim 2, the switches are rotary switches to which numbers corresponding to positions of knobs are assigned.

* * * * *